United States Patent
Pfeiffer (10) Patent No.: US 9,394,986 B2
(45) Date of Patent: Jul. 19, 2016

(54) SPROCKET

(71) Applicant: Wolf Tooth Components, LLC, Savage, MN (US)

(72) Inventor: Michael W. Pfeiffer, Savage, MN (US)

(73) Assignee: Wolf Tooth Components, LLC, Savage, MN (US)

( * ) Notice: Subject to any disclaimer, the term of this patent is extended or adjusted under 35 U.S.C. 154(b) by 0 days.

(21) Appl. No.: 14/596,765

(22) Filed: Jan. 14, 2015

(65) Prior Publication Data

US 2015/0226306 A1    Aug. 13, 2015

Related U.S. Application Data (60) Provisional application No. 61/937,733, filed on Feb. 10, 2014.

(51) Int. Cl.
  *F16H 55/30*  (2006.01)
  *F16H 7/06*   (2006.01)
  *B62M 9/10*   (2006.01)

(52) U.S. Cl.
  CPC ............ *F16H 55/30* (2013.01); *B62M 9/10* (2013.01); *B62M 9/105* (2013.01)

(58) Field of Classification Search
  CPC ....... F16H 55/30; F16H 7/06; F16H 57/0006; B62M 9/10; B62M 9/105
  USPC .................................................. 474/152, 156
  See application file for complete search history.

(56) References Cited

U.S. PATENT DOCUMENTS

| 257,445 | A | * | 5/1882 | Lechner ................. F16H 7/06 474/152 |
| 495,584 | A | | 4/1893 | Guthrie |
| 536,813 | A | * | 4/1895 | MacPhail et al. ....... F16H 55/30 474/152 |
| 586,991 | A | * | 7/1897 | Curley ................. F16H 55/30 474/156 |
| 590,649 | A | * | 9/1897 | Ribyn, Jr. ............. F16H 55/30 474/156 |
| 591,270 | A | * | 10/1897 | Gauthier .............. F16H 55/30 474/156 |
| 619,537 | A | | 2/1899 | Bufford |
| 1,482,896 | A | | 2/1924 | Huntington et al. |
| 1,835,406 | A | | 12/1931 | Kirsten |
| 2,602,343 | A | * | 7/1952 | Barrett ................. B62D 55/08 299/83.1 |
| 3,391,863 | A | | 7/1968 | Huffman et al. |
| 3,654,814 | A | | 4/1972 | Richmond |

(Continued)

FOREIGN PATENT DOCUMENTS

DE    1086957 B    8/1960
DE    2816137 A1   10/1979

(Continued)

OTHER PUBLICATIONS

Third-Party Submission submitted in related U.S. Appl. No. 14/596,761 on Dec. 17, 2015.

*Primary Examiner* — Henry Liu
(74) *Attorney, Agent, or Firm* — Dicke, Billig & Czaja, PLLC (57) ABSTRACT

A sprocket includes first teeth having a first maximum width, and second teeth having a second maximum width greater than the first maximum width alternately arranged with the first teeth. The second teeth have a leading surface relative to a drive direction of the sprocket, a lateral surface at the second maximum width, a relief between the leading surface and the lateral surface, and a relief cut in the relief, with a midline of the lateral surface being offset relative to a plane extended radially through a center of a respective tooth.

19 Claims, 13 Drawing Sheets

(56) References Cited

U.S. PATENT DOCUMENTS

| | | |
|---|---|---|
| 3,730,009 A | 5/1973 | Mead et al. |
| 3,745,851 A | 7/1973 | Zeldman et al. |
| 3,956,943 A * | 5/1976 | Yamasaki ............... F16H 55/30 474/148 |
| 3,969,947 A * | 7/1976 | Martin ................... F16H 55/30 474/152 |
| 3,990,136 A | 11/1976 | Hishida |
| 4,144,773 A | 3/1979 | Addicks |
| 4,174,642 A * | 11/1979 | Martin ................... F16H 55/30 474/152 |
| 4,240,303 A | 12/1980 | Mosley |
| 4,261,214 A | 4/1981 | Watanabe et al. |
| 4,330,286 A | 5/1982 | Nagano |
| 4,348,199 A | 9/1982 | Oonuma et al. |
| 4,433,963 A | 2/1984 | Shimano |
| 4,472,164 A | 9/1984 | Pusch et al. |
| 4,501,575 A | 2/1985 | Lapeyre |
| 4,586,914 A | 5/1986 | Nagano |
| 4,589,860 A | 5/1986 | Brandenstein et al. |
| 4,867,733 A | 9/1989 | Yamanoi et al. |
| 5,098,346 A | 3/1992 | Redmond |
| 5,318,483 A | 6/1994 | Reid et al. |
| 5,362,278 A | 11/1994 | Bergles et al. |
| 5,503,598 A | 4/1996 | Neuer et al. |
| 5,545,096 A | 8/1996 | Su |
| 5,921,878 A * | 7/1999 | Young ................... F16G 13/06 474/156 |
| 5,921,879 A * | 7/1999 | Young ................... F16H 7/06 474/156 |
| 6,013,001 A * | 1/2000 | Miyoshi ................. B62M 9/10 474/156 |
| 6,090,003 A * | 7/2000 | Young ................... F16H 7/06 474/152 |
| D435,492 S | 12/2000 | Shy |
| 6,190,275 B1 | 2/2001 | Ciancio et al. |
| 6,203,462 B1 | 3/2001 | Takamori |
| 6,220,970 B1 | 4/2001 | Berger et al. |
| 6,325,734 B1 * | 12/2001 | Young ................... F16H 7/06 474/156 |
| 6,340,338 B1 | 1/2002 | Kamada |
| 6,468,173 B1 | 10/2002 | Jeong |
| 6,500,084 B2 | 12/2002 | Wigsten |
| 6,540,630 B1 | 4/2003 | Oertley |
| D478,849 S | 8/2003 | Griffin et al. |
| 6,666,786 B2 | 12/2003 | Yahata |
| 6,761,657 B2 * | 7/2004 | Young ................... F16H 7/06 474/152 |
| 6,899,651 B2 | 5/2005 | Oertley |
| 7,094,170 B2 | 8/2006 | Young |
| D540,718 S | 4/2007 | Wickliffe |
| 7,416,500 B2 * | 8/2008 | Young ................... F16H 7/06 474/152 |
| 7,491,143 B2 | 2/2009 | Valle |
| D599,255 S | 9/2009 | Wickliffe et al. |
| D599,716 S | 9/2009 | Wickliffe et al. |
| D599,717 S | 9/2009 | Wickliffe et al. |
| D599,718 S | 9/2009 | Wickliffe et al. |
| D599,719 S | 9/2009 | Wickliffe et al. |
| D607,784 S | 1/2010 | Gisbert |
| 7,686,721 B2 | 3/2010 | Tabe et al. |
| 7,824,287 B2 * | 11/2010 | Nonoshita ............. B62M 9/10 474/152 |
| 7,967,709 B2 | 6/2011 | Emura et al. |
| 8,365,881 B2 | 2/2013 | Iwai et al. |
| D715,699 S | 10/2014 | Reiter et al. |
| D716,191 S | 10/2014 | Reiter |
| 8,882,619 B2 * | 11/2014 | Braedt .................... B62M 9/10 474/156 |
| 8,888,631 B2 | 11/2014 | Morita |
| 2002/0086753 A1 | 7/2002 | Yahata |
| 2003/0083166 A1 | 5/2003 | Oertley |
| 2005/0079940 A1 | 4/2005 | Reiter |
| 2005/0272546 A1 | 12/2005 | Reiter |
| 2005/0282672 A1 | 12/2005 | Nonoshita |
| 2006/0073927 A1 | 4/2006 | Haesloop |
| 2006/0128511 A1 | 6/2006 | Oishi et al. |
| 2006/0258498 A1 | 11/2006 | Tabe et al. |
| 2007/0054768 A1 * | 3/2007 | Miyazawa ............. F16H 55/30 474/152 |
| 2009/0082147 A1 | 3/2009 | Braedt |
| 2010/0075791 A1 | 3/2010 | Braedt |
| 2010/0227720 A1 * | 9/2010 | Mehta .................... F16H 55/30 474/155 |
| 2011/0092327 A1 | 4/2011 | Oishi |
| 2011/0105263 A1 | 5/2011 | Braedt |
| 2012/0225745 A1 | 9/2012 | Oishi et al. |
| 2013/0072334 A1 * | 3/2013 | Braedt .................... F16H 7/06 474/156 |
| 2013/0109519 A1 | 5/2013 | Morita |
| 2013/0139642 A1 * | 6/2013 | Reiter ................... B62M 9/105 74/594.2 |
| 2013/0143704 A1 | 6/2013 | Blank et al. |
| 2013/0184110 A1 * | 7/2013 | Reiter ................... F16H 55/303 474/152 |
| 2014/0100069 A1 * | 4/2014 | Reiter ................... B62M 9/105 474/156 |
| 2014/0162821 A1 | 6/2014 | Braedt et al. |
| 2014/0335983 A1 | 11/2014 | Iwai et al. |
| 2014/0335987 A1 | 11/2014 | Iwai et al. |
| 2014/0338494 A1 | 11/2014 | Sugimoto et al. |
| 2014/0364259 A1 * | 12/2014 | Reiter ................... F16H 55/30 474/155 |
| 2015/0198231 A1 | 7/2015 | Emura |
| 2015/0203173 A1 | 7/2015 | Nishimoto et al. |
| 2015/0239528 A1 | 8/2015 | Barefoot et al. |
| 2015/0291255 A1 | 10/2015 | Nishimoto et al. |
| 2015/0337943 A1 | 11/2015 | Sugimoto |
| 2015/0362057 A1 | 12/2015 | Wesling et al. |

FOREIGN PATENT DOCUMENTS

| | | |
|---|---|---|
| DE | 102012109931 A1 | 5/2013 |
| EP | 1764296 A1 | 3/2007 |
| FR | 2545902 A1 | 11/1984 |
| FR | 2657134 A1 | 7/1991 |
| GB | 2005363 A | 4/1979 |
| JP | 5642489 | 4/1981 |
| JP | S5642489 | 4/1981 |
| JP | 60104866 A | 6/1985 |
| JP | H1171795 | 12/1989 |
| JP | 2000355295 | 12/2000 |
| JP | 2001187957 A | 7/2001 |
| JP | 2002243020 A | 8/2002 |
| JP | 2007071302 | 3/2007 |
| JP | 2007198403 | 8/2007 |
| JP | 201236982 | 2/2012 |
| JP | 201324307 | 2/2013 |
| JP | 201379698 | 5/2013 |
| TW | i316490 | 11/2009 |
| TW | i338655 | 10/2010 |
| WO | 9806962 | 2/1998 |
| WO | 03095867 A1 | 11/2003 |

* cited by examiner

SPROCKET

CROSS-REFERENCE TO RELATED APPLICATIONS

This application claims priority under 35 U.S.C. §119(e) to U.S. Provisional Patent Application Ser. No. 61/937,733 filed on Feb. 10, 2014, and incorporated herein by reference.

This application is related to U.S. Non-Provisional patent application Ser. No. 14/596,761 filed on even date herewith, U.S. Non-Provisional patent application Ser. No. 14/596,797 filed on even date herewith, and U.S. Non-Provisional patent application Ser. No. 14/596,799 filed on even date herewith.

BACKGROUND

The present disclosure relates generally to sprockets and, more specifically, relates to a sprocket having alternating wide and narrow teeth for use as a chainring on a bicycle.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Figure 1:
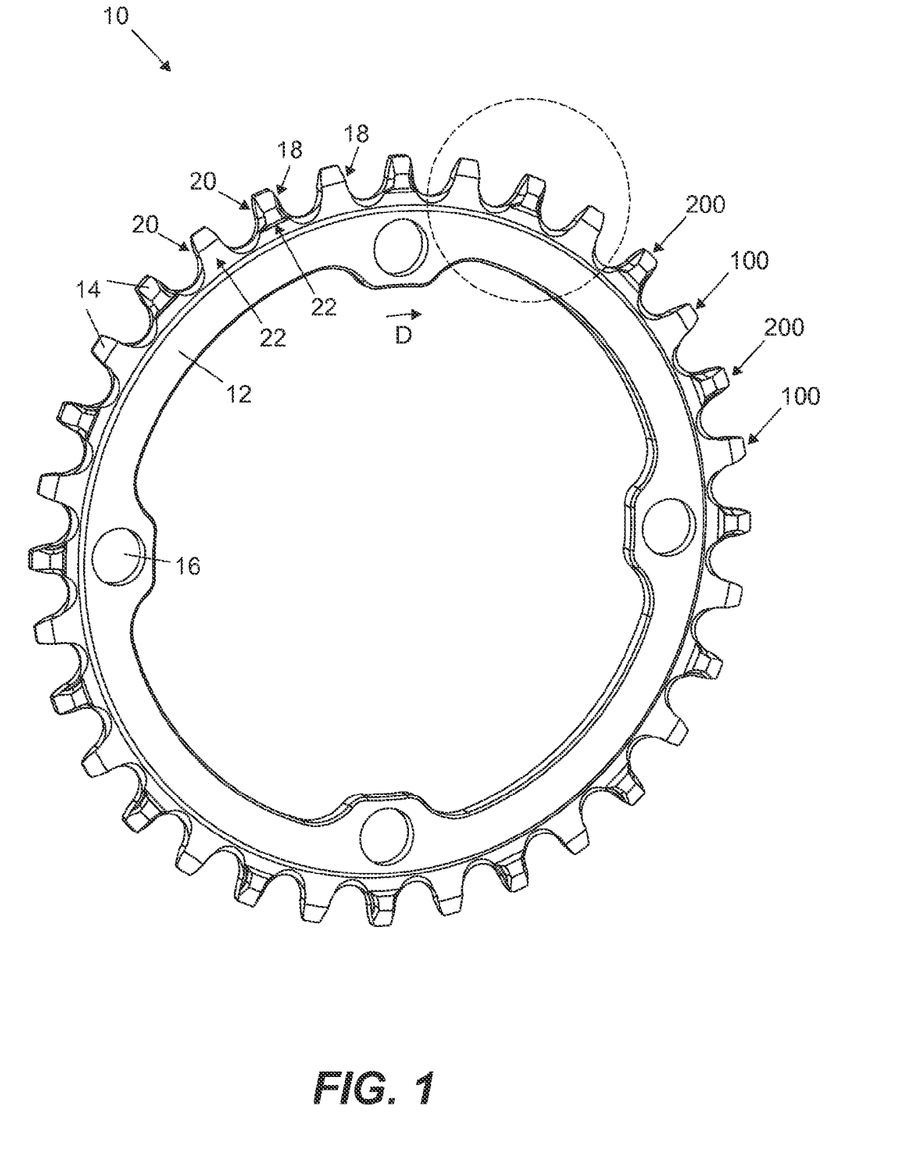
FIG. 1 is a left-front perspective view of one example of a sprocket in accordance with the present disclosure.
Figure 2:
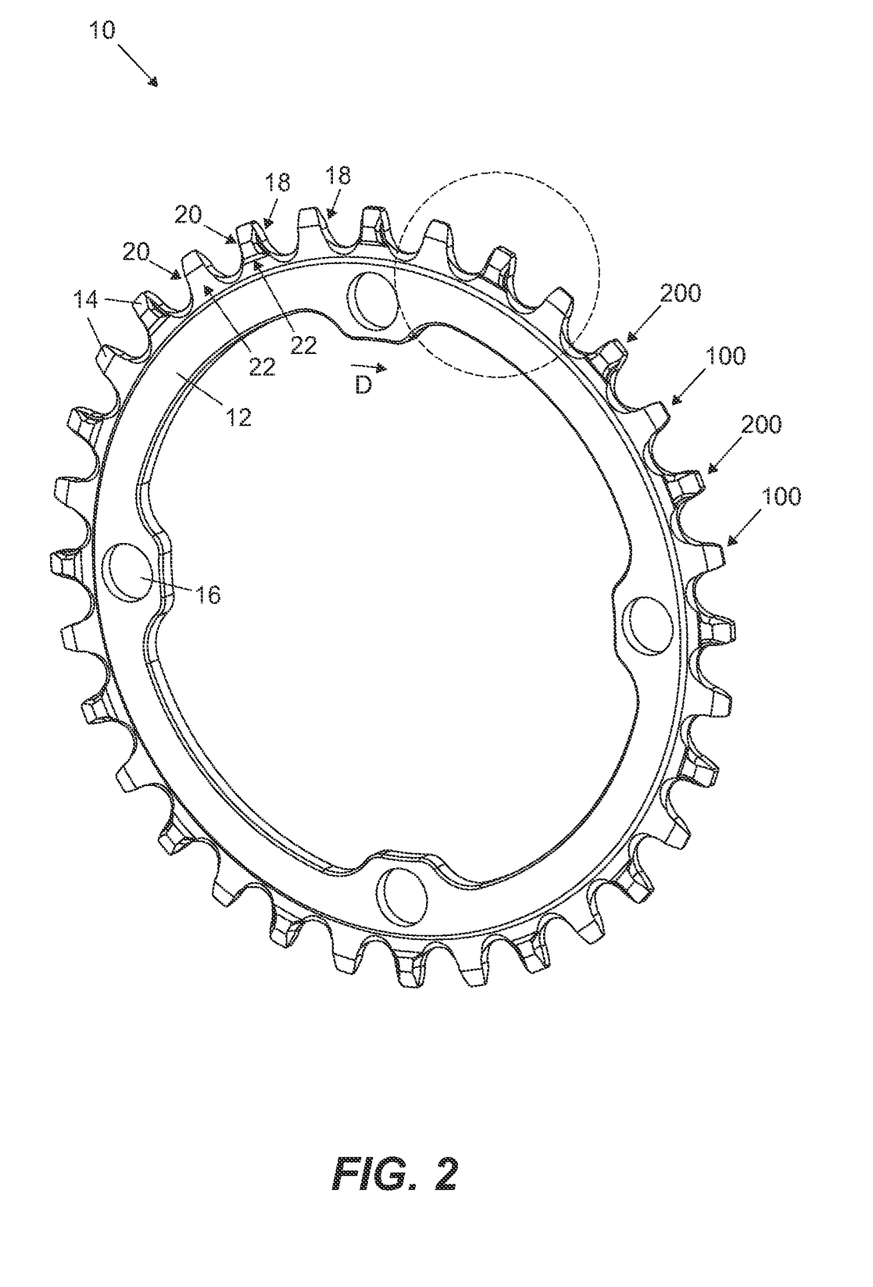
FIG. 2 is a right-front perspective view of the sprocket of FIG. 1.
Figure 3:
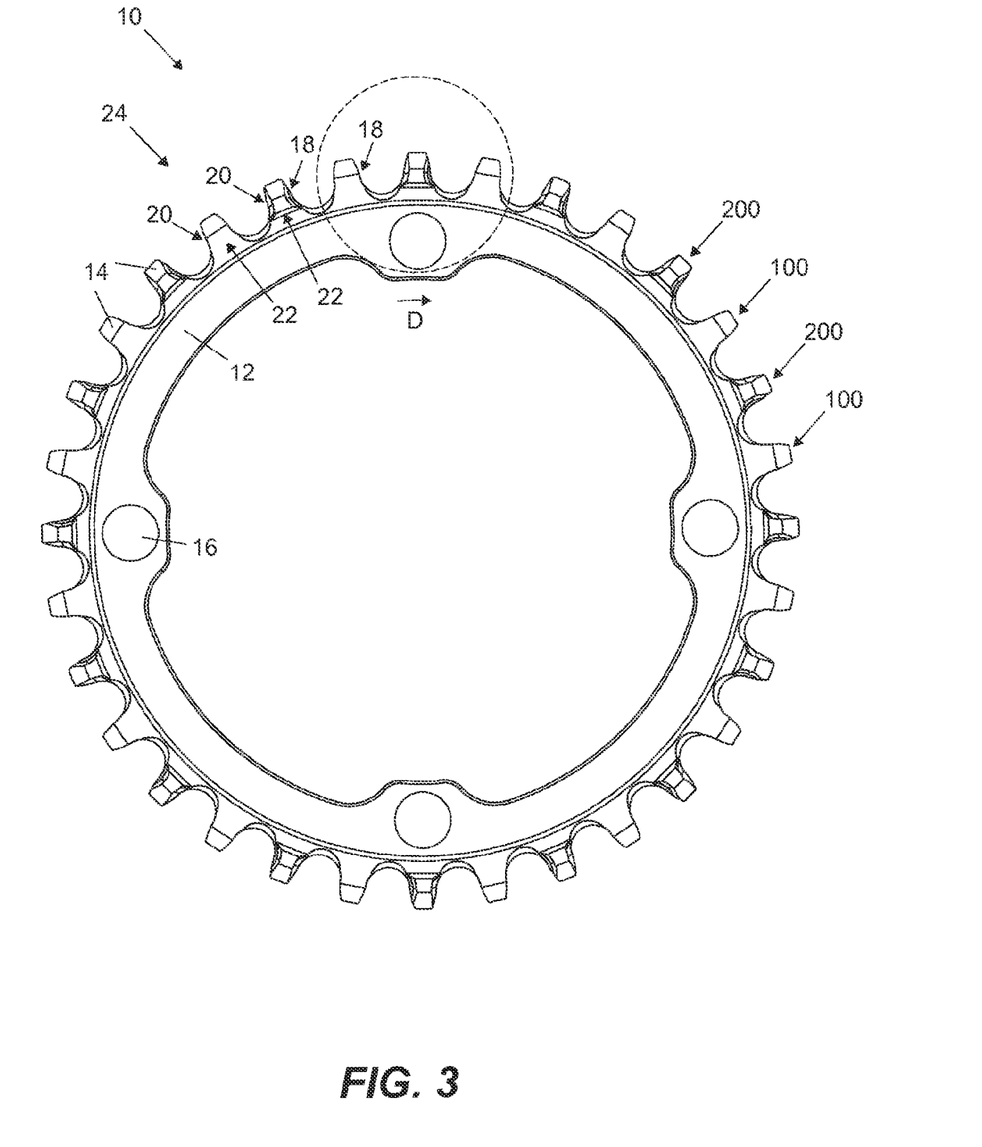
FIG. 3 is a front view of the sprocket of FIG. 1.
Figure 4:
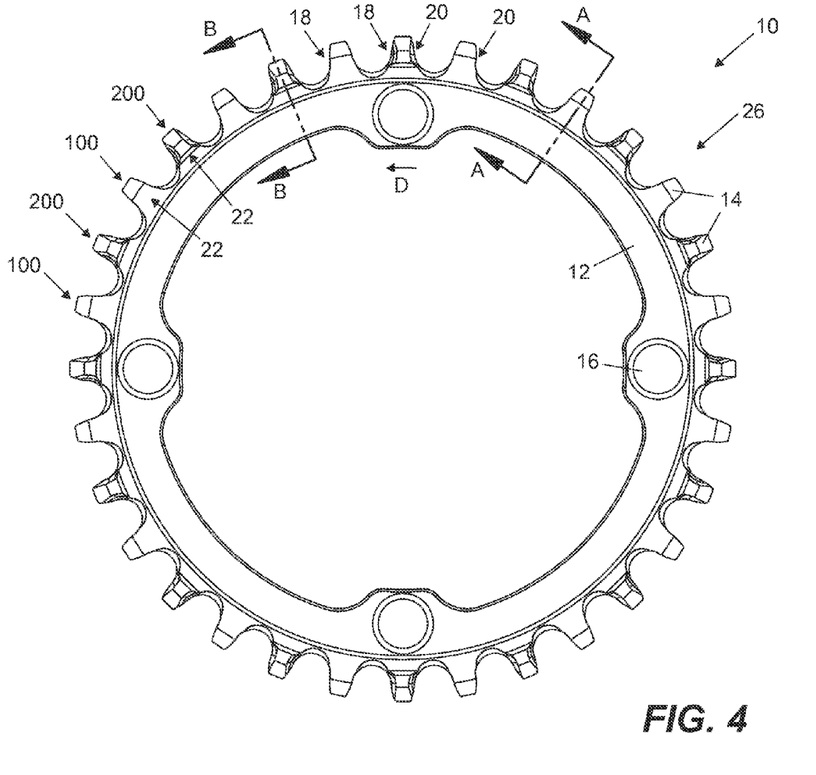
FIG. 4 is a rear view of the sprocket of FIG. 1.
Figure 4A:
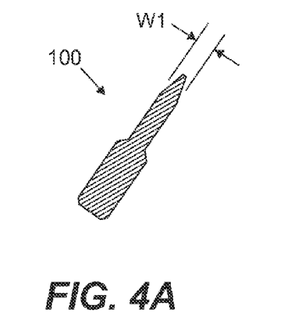
FIGS. 4A and 4B are cross-sectional views from the perspective of lines A-A and B-B, respectively, of FIG. 4.
Figure 4B:
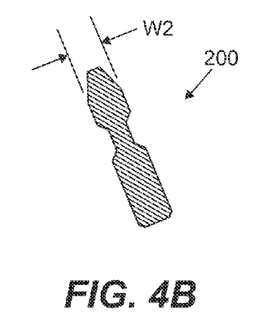
Figure 5:
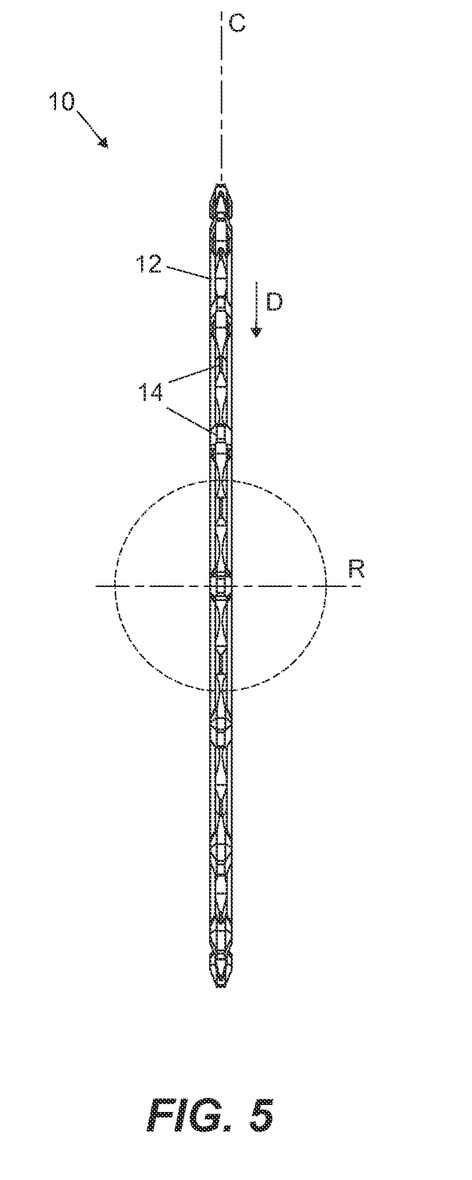
FIG. 5 is a side view of the sprocket of FIG. 1.
Figure 6:
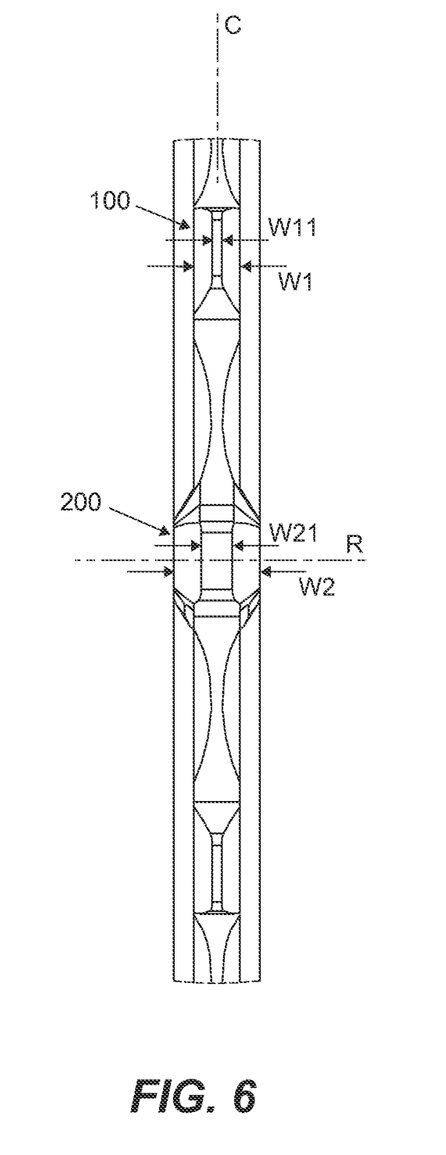
FIG. 6 is an enlarged view of the area within the broken line circle of FIG. 5.

FIGS. 1 and 2 are left-front and right-front perspective views, respectively, of one example of a sprocket 10 for use as a chainring on a bicycle (not shown). In addition, FIGS. 3 and 4 are front and rear views, respectively, of sprocket 10. Furthermore, FIG. 5 is a side view of sprocket 10, where the side view of FIG. 5 represents left, right, top, and bottom views of sprocket 10, and FIG. 6 is an enlarged view of the area within the broken line circle of FIG. 5.

As illustrated in FIGS. 1-6, sprocket 10 includes a body 12 and a plurality of teeth 14 radially, outwardly extending, projecting from body 12. In one example, body 12 includes one or more mounting holes 16 for mounting or securing sprocket 10 to a crank assembly (not shown) of a bicycle. It is understood that the number, size, form, configuration, and/or arrangement of mounting holes 16 may vary. In addition, sprocket 10 may include one or more other features (in addition to and/or in place of mounting holes 16) to mount or secure sprocket 10 to a crank assembly.

In one example, sprocket 10 has a rotational axis R and a centerline C normal to rotational axis R such that sprocket 10 rotates about rotational axis R in a plane coinciding with centerline C normal to rotational axis R. In the example illustrated, sprocket 10 rotates in a drive direction D about rotational axis R such that teeth 14 each have a drive side 18 and a non-drive side 20 relative to drive direction D. In addition, teeth 14 each have opposite lateral sides 22 relative to centerline C and drive direction D. Although illustrated as being circular in shape, sprocket 10 may be non-circular, for example, elliptical, pseudo-elliptical, oval, ovoid, parabolic, etc.

The front view of FIG. 3 represents an outboard side 24 of sprocket 10 and the rear view of FIG. 4 represents an inboard side 26 of sprocket 10 when sprocket 10 is mounted or secured to a crank assembly of a bicycle and rotated (driven) in drive direction D. In one example, teeth 14 of sprocket 10 are substantially symmetrical about centerline C such that a shape or profile of teeth 14 on outboard side 24 and inboard side 26 substantially mirror each other. In one example, as described below, teeth 14 of sprocket 10 engage a roller chain such that rotation of sprocket 10 in drive direction D imparts movement to the roller chain.

In the example illustrated in FIGS. 1-6, teeth 14 include alternating teeth of different width or thickness. More specifically, in one example, and with reference to FIGS. 4A and 4B, teeth 14 include a plurality of first teeth 100 each having a first width W1 (defined as or formed by a maximum width between opposite lateral sides 22) and a plurality of second teeth 200 each having a second width W2 (defined as or formed by a maximum width between opposite lateral sides 22) such that second width W2 is greater than first width W1.

In one example, first teeth 100 and second teeth 200 are alternately arranged with one second tooth 200 positioned between two first teeth 100 (or one first tooth 100 positioned between two second teeth 200). As such, first teeth 100 and second teeth 200 form a sequence or series of alternating wide and narrow teeth about a periphery of sprocket 10. In one example, first teeth 100 and second teeth 200 each include an even number of teeth and, more specifically, each include the same number of teeth.

In one example, as illustrated in FIGS. 5 and 6, first teeth 100 and second teeth 200 are aligned along centerline C. In addition, in one example, first teeth 100 and second teeth 200 are substantially symmetrical about centerline C. As such, the shapes and/or profiles of first teeth 100 and second teeth 200 are substantially symmetrical about centerline C.

Figure 7:
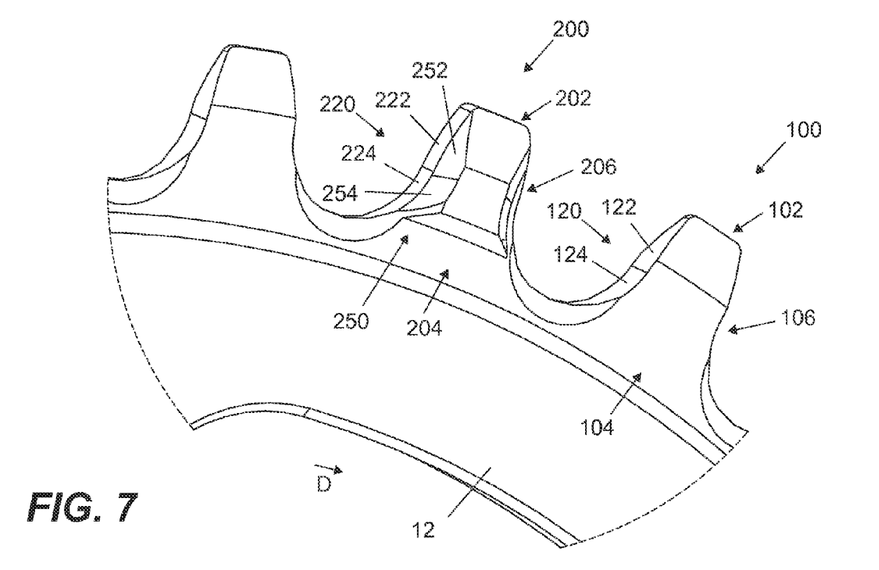
FIG. 7 is an enlarged view of the area within the broken line circle of FIG. 1.
Figure 8:
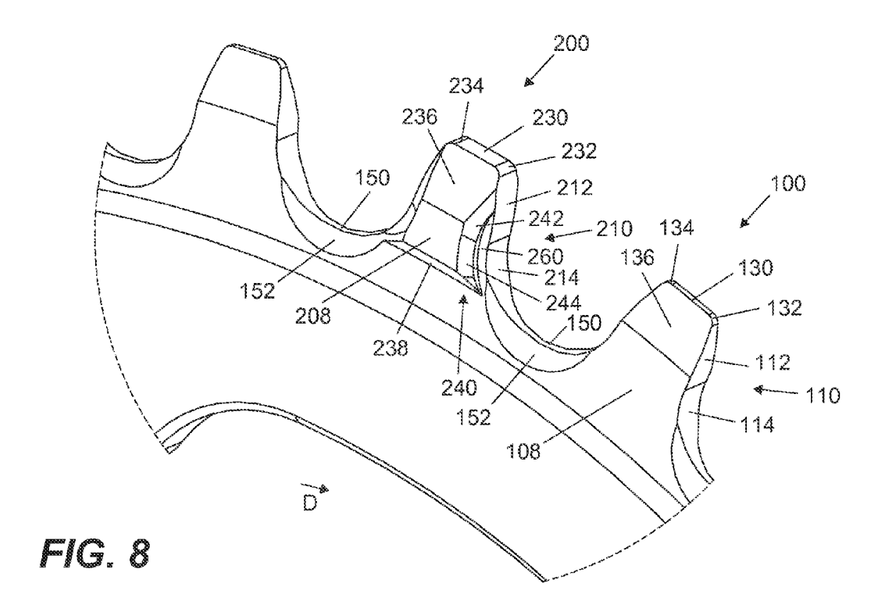
FIG. 8 is an enlarged view of the area within the broken line circle of FIG. 2.
Figure 9:
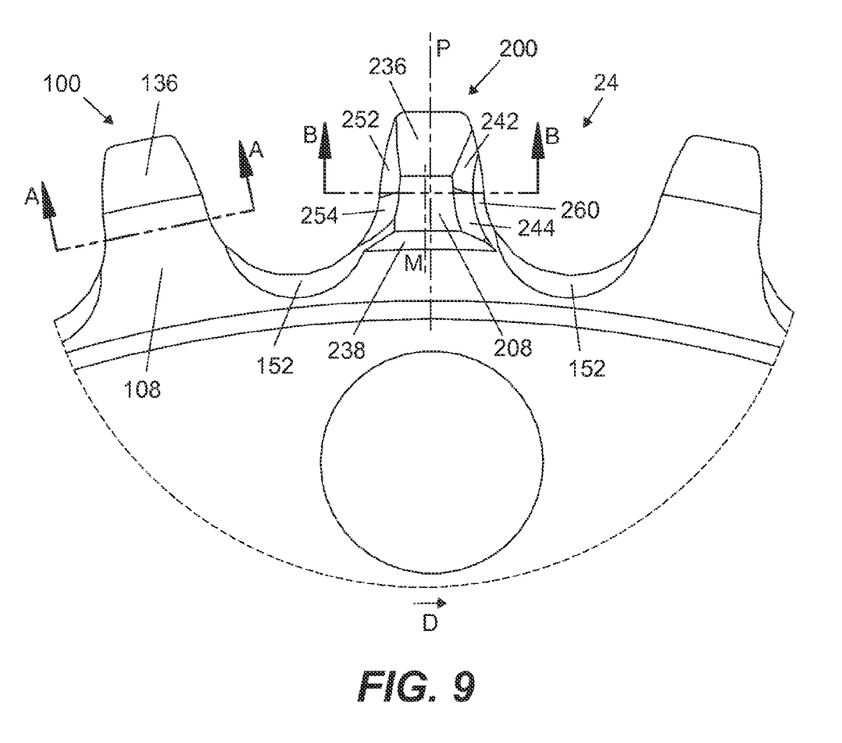
FIG. 9 is an enlarged view of the area within the broken line circle of FIG. 3.

FIGS. 7, 8, and 9 are enlarged views of the areas within the broken line circles of FIGS. 1, 2, and 3, respectively. More specifically, FIGS. 7, 8, and 9 illustrate the shapes and/or profiles of first teeth 100 and second teeth 200 from the perspective of outboard side 24 of sprocket 10. As teeth 14 of sprocket 10 are substantially symmetrical about centerline C, the illustrations and associated descriptions of the shapes and/or profiles of first teeth 100 and second teeth 200 from the perspective of outboard side 24 of sprocket 10 are also applicable to the shapes and/or profiles of first teeth 100 and second teeth 200 from the perspective of inboard side 26 of sprocket 10.

Figure 9A:
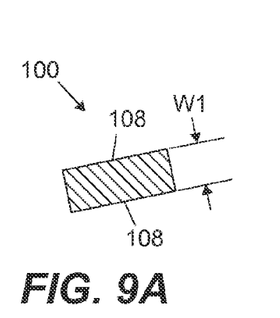
FIGS. 9A and 9B are cross-sectional views from the perspective of lines A-A and B-B, respectively, of FIG. 9.

In one example, as illustrated in FIGS. 7, 8, and 9, first teeth 100 each terminate with a tip portion 102, and include a base or root portion 104 extended from body 12 of sprocket 10 and an intermediate portion 106 formed or defined between root portion 104 and tip portion 102. Intermediate portion 106 provides a lateral surface 108 of first teeth 100 such that first width W1 (FIG. 9A) is formed by or defined as a maximum width between lateral surface 108 as provided on opposite sides 22 of first teeth 100. In addition, first teeth 100 each include a front (leading) or drive-side surface 110 and a rear (trailing) or non-drive-side surface 120.

In one example, drive-side surface 110 of first teeth 100 includes and/or is formed or defined by a drive-side face 112 and a drive-side flank 114, and non-drive-side surface 120 of first teeth 100 includes and/or is formed or defined by a non-drive-side face 122 and a non-drive-side flank 124. In one example, drive-side face 112 extends between a top land 130 of tip portion 102 and drive-side flank 114, and drive-side flank 114 extends between drive-side face 112 and a bottom land 150 formed and/or defined between adjacent teeth. In addition, non-drive-side face 122 extends between top land 130 of tip portion 102 and non-drive-side flank 124, and non-drive-side flank 124 extends between non-drive-side face 122 and bottom land 150 formed and/or defined between adjacent teeth.

In one example, tooth tip radii 132 and 134 provide a transition between top land 130 and drive-side face 112 of drive-side surface 110 and non-drive-side face 122 of non-drive-side surface 120, respectively. In addition, in one example, a width W11 (FIG. 6) of top land 130 is substantially uniform and coincides with and/or is substantially the same as a width of tooth tip radii 132 and 134 at the transition between top land 130 and drive-side face 112 of drive-side surface 110 and non-drive-side face 122 of non-drive-side surface 120.

In one example, first teeth 100 each include a lateral tooth tip chamfer 136 formed and/or defined between intermediate portion 106 and tip portion 102. As such, lateral tooth tip chamfer 136 reduces a width of and provides a taper to first teeth 100 in a radial direction from lateral surface 108 of intermediate portion 106 to top land 130 of tip portion 102. Thus, width W11 (FIG. 6) of top land 130 of first teeth 100 is less than width W1 (FIG. 6) of intermediate portion 106 of first teeth 100 as defined by lateral surface 108.

In one example, as illustrated in FIGS. 7, 8, and 9, second teeth 200 each terminate with a tip portion 202, and include a base or root portion 204 extended from body 12 of sprocket 10 and a intermediate portion 206 formed or defined between root portion 204 and tip portion 202. Intermediate portion 206 provides a lateral surface 208 of second teeth 200 such that second width W2 (FIG. 9B) is formed by or defined as a maximum width between lateral surface 208 as provided on opposite sides 22 of second teeth 200. In addition, second teeth 200 each include a front (leading) or drive-side surface 210 and a rear (trailing) or non-drive-side surface 220.

In one example, drive-side surface 210 of second teeth 200 includes and/or is formed or defined by a drive-side face 212 and a drive-side flank 214, and non-drive-side surface 220 of second teeth 200 includes and/or is formed or defined by a non-drive-side face 222 and a non-drive-side flank 224. In one example, drive-side face 212 extends between a top land 230 of tip portion 202 and drive-side flank 214, and drive-side flank 214 extends between drive-side face 212 and bottom land 150 formed and/or defined between adjacent teeth. In addition, non-drive-side face 222 extends between top land 230 of tip portion 202 and non-drive-side flank 224, and non-drive-side flank 224 extends between non-drive-side face 222 and bottom land 150 formed and/or defined between adjacent teeth.

In one example, tooth tip radii 232 and 234 provide a transition between top land 230 and drive-side face 212 of drive-side surface 210 and non-drive-side face 222 of non-drive-side surface 220, respectively. In addition, in one example, a width W21 (FIG. 6) of top land 230 is substantially uniform and coincides with and/or is substantially the same as a width of tooth tip radii 232 and 234 at the transition between top land 230 and drive-side face 212 of drive-side surface 210 and non-drive-side face 222 of non-drive-side surface 220.

In one example, second teeth 200 each include a lateral tooth tip chamfer 236 formed and/or defined between intermediate portion 206 and tip portion 202. As such, lateral tooth tip chamfer 236 reduces a width of and provides a taper to second teeth 200 in a radial direction from lateral surface 208 of intermediate portion 206 to top land 230 of tip portion 202. Thus, width W21 (FIG. 6) of top land 230 of second teeth 200 is less than width W2 (FIG. 6) of intermediate portion 206 of second teeth 200 as defined by lateral surface 208.

In one example, as illustrated in FIG. 6, width W21 of top land 230 of second teeth 200 is greater than width W11 (FIG. 6) of top land 130 of first teeth 100. Width W21 of top land 230, however, may be less than width W11 of top land 130. In addition, width W21 of top land 230 and width W11 of top land 130 may be substantially the same (substantially equal).

In one example, second teeth 200 each include a lateral tooth root chamfer 238 formed and/or defined between intermediate portion 206 and root portion 204. As such, lateral tooth root chamfer 238 reduces a width of and provides a taper to second teeth 200 along a radial direction from lateral surface 208 to root portion 204. Thus, a width of root portion 204 of second teeth 200 is less than width W2 (FIG. 4B) of intermediate portion 206 of second teeth 200 as defined by lateral surface 208.

In one example, second teeth 200 each include a drive-side relief 240 and a non-drive-side relief 250. In one example, drive-side relief 240 extends and provides a transition between drive-side surface 210 and lateral surface 208, and extends and provides a transition between drive-side surface 210 and lateral tooth tip chamfer 236 and lateral tooth root chamfer 238. In addition, non-drive-side relief 250 extends and provides a transition between non-drive-side surface 220 and lateral surface 208, and extends and provides a transition between non-drive-side surface 220 and lateral tooth tip chamfer 236 and lateral tooth root chamfer 238. As such, drive-side relief 240 extends and provides transition between and among drive-side surface 210, lateral surface 208, lateral tooth tip chamfer 236, and lateral tooth root chamfer 238, and non-drive-side relief 250 extends and provides transition between and among non-drive-side surface 220, lateral surface 208, lateral tooth tip chamfer 236, and lateral tooth root chamfer 238.

In one example, drive-side relief 240 includes a drive-side face relief 242 and a drive-side flank relief 244, and non-drive-side relief 250 includes a non-drive-side face relief 252 and a non-drive-side flank relief 254. As such, in one example, drive-side face relief 242 extends and provides a transition between drive-side face 212, lateral tooth tip chamfer 236, and lateral surface 208, and drive-side flank relief 244 extends and provides a transition between drive-side flank 214, lateral surface 208, and lateral tooth root chamfer 238. More specifically, drive-side face relief 242 extends from drive-side face 212 to lateral tooth tip chamfer 236 and lateral surface 208, and drive-side flank relief 244 extends to lateral surface 208 and lateral tooth root chamfer 238. In addition, non-drive-side face relief 252 extends and provides a transition between non-drive-side face 222, lateral tooth tip chamfer 236, and lateral surface 208, and non-drive-side flank relief 254 extends and provides a transition between non-drive-side flank 224, lateral surface 208, and lateral tooth root chamfer 238. More specifically, non-drive-side face relief 252 extends from non-drive-side face 222 to lateral tooth tip chamfer 236 and lateral surface 208, and non-drive-side flank relief 254 extends from non-drive-side flank 224 to lateral surface 208 and lateral tooth root chamfer 238.

In one example, second teeth 200 are asymmetrical about a plane P (FIG. 9, 9B) extended radially from rotational axis R (FIG. 5) through a tooth root center and tooth tip center of a respective tooth. More specifically, in one example, asymmetry of second teeth 200 includes lateral surface 208 being offset in a direction opposite drive direction D relative to plane P. More specifically, in one example, a midline M of lateral surface 208 is offset ("shifted") in a direction opposite drive direction D relative to plane P. In addition, in one example, asymmetry of second teeth 200 includes a maximum width W3 (FIG. 9B) of drive surface 210 being greater than a maximum width W4 (FIG. 9B) of non-drive-side surface 220.

Figure 9B:
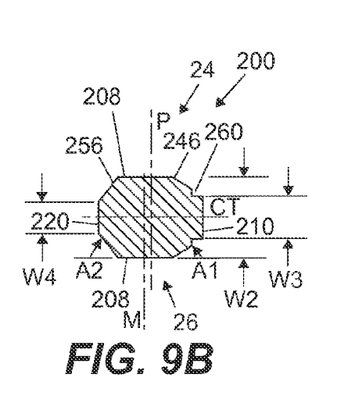
Figure 10:
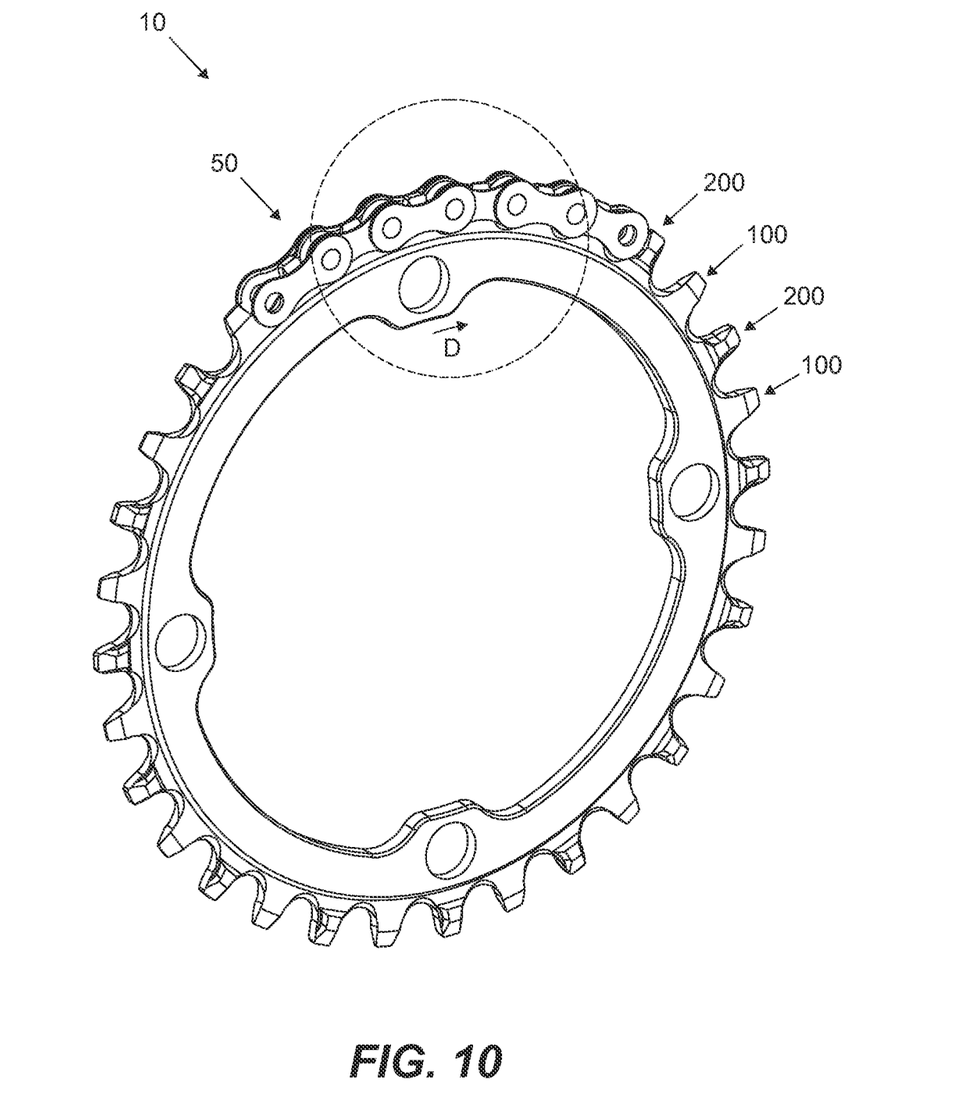
FIG. 10 is a left-front perspective view of one example of a sprocket in accordance with the present disclosure engaged with a section of a roller chain.
Figure 11:
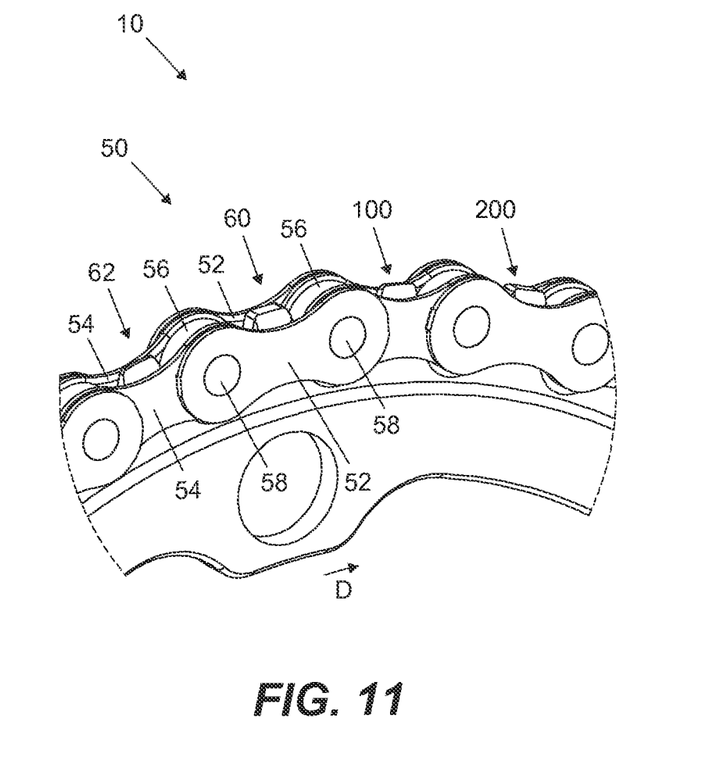
FIG. 11 is an enlarged view of the area within the broken line circle of FIG. 10.
Figure 12:
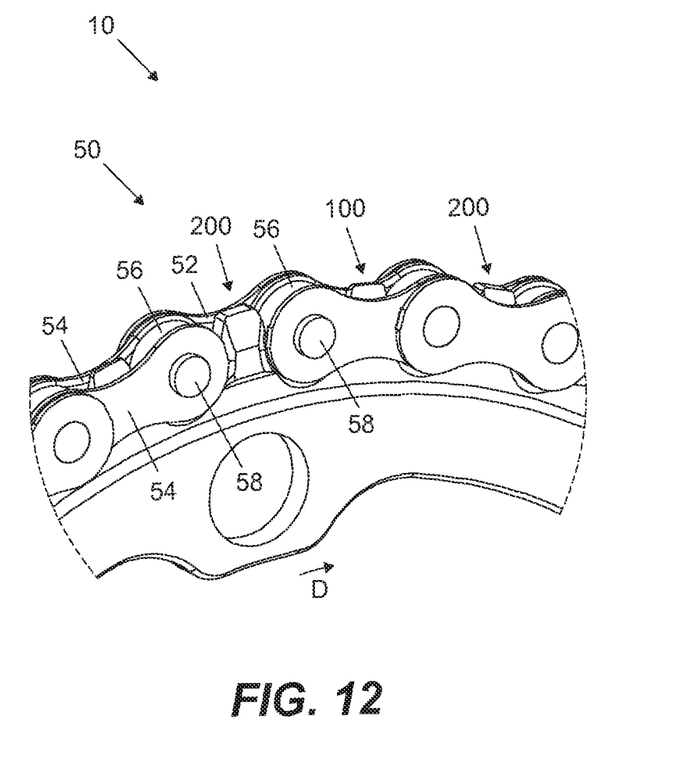
FIG. 12 is an enlarged view similar to FIG. 11 with an outer link plate removed from the roller chain on an outboard side of the sprocket.
Figure 13:
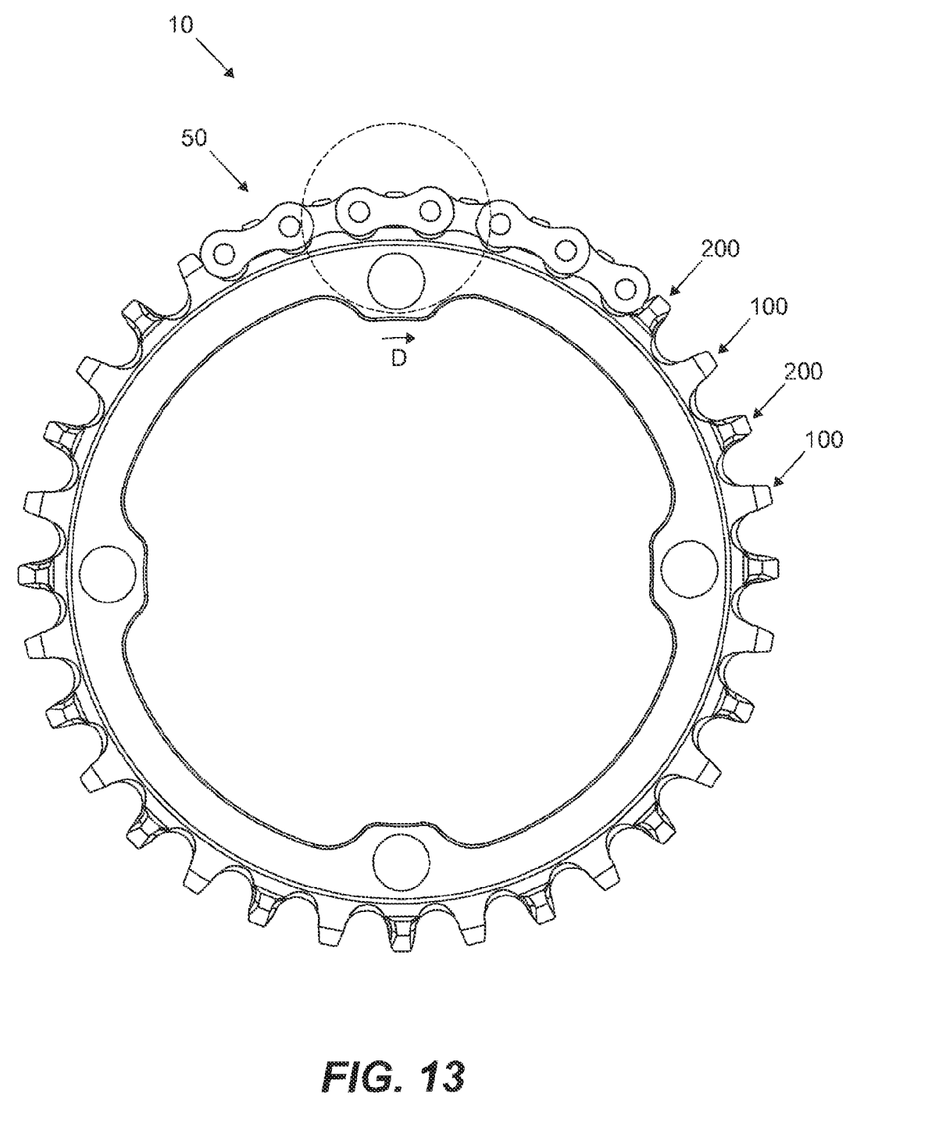
FIG. 13 is a front view of the sprocket of FIG. 10 engaged with a section of a roller chain.
Figure 14:
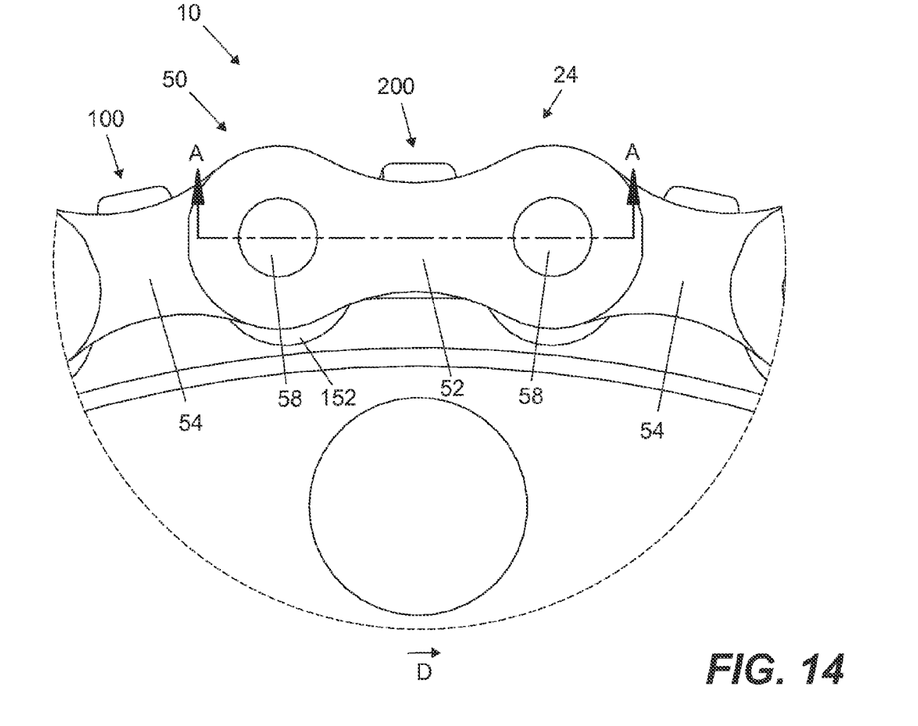
FIG. 14 is an enlarged view of the area within the broken line circle of FIG. 13.
Figure 14A:
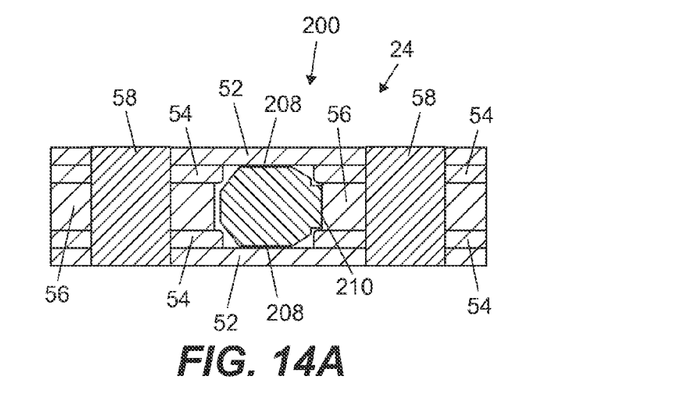
FIG. 14A is a cross-sectional view from the perspective of line A-A of FIG. 14.
Figure 15:
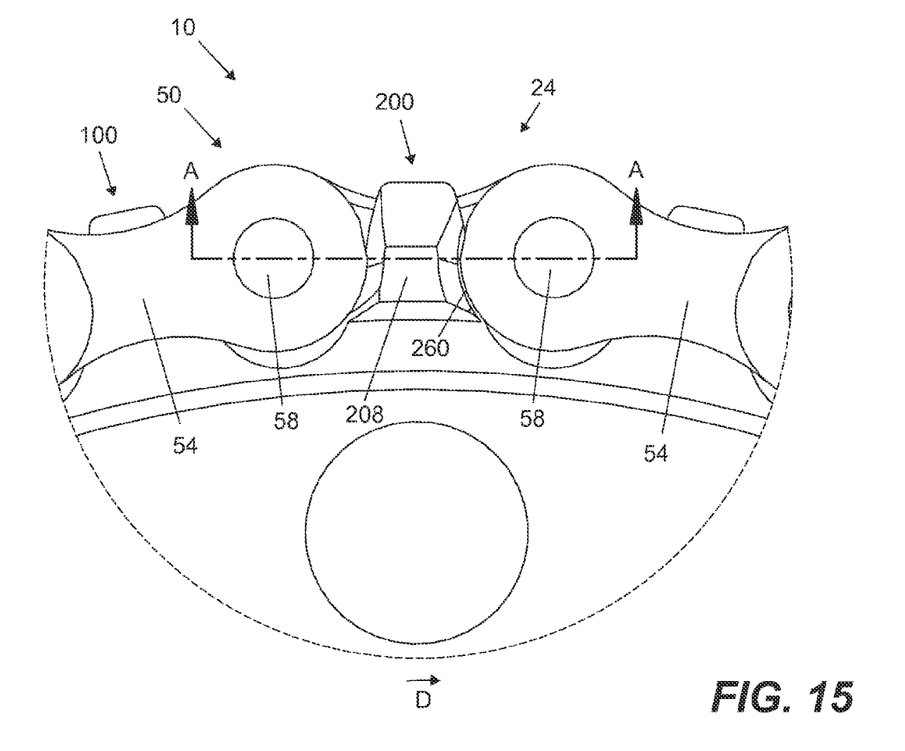
FIG. 15 is an enlarged view similar to FIG. 14 with an outer link plate removed from the roller chain on an outboard side of the sprocket.
Figure 15A:
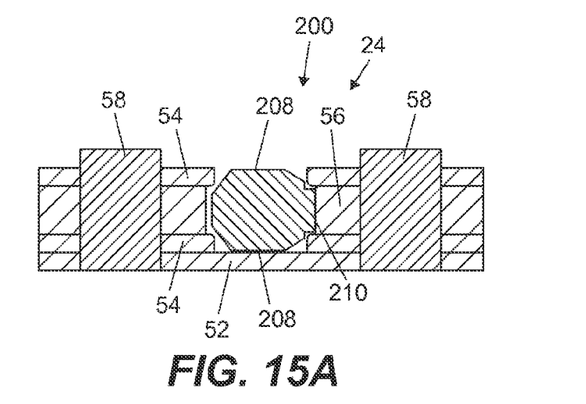
FIG. 15A is a cross-sectional view from the perspective of line A-A of FIG. 15.

In one example, second teeth 200 are symmetrical about a tooth centerline CT (FIG. 9B) extended through drive-side surface 210 and non-drive-side surface 220. More specifically, in one example, tooth centerline CT intersects (bisects) drive-side surface 210 and non-drive-side surface 220, and is oriented substantially perpendicular to plane P. Thus, in one example, second teeth 200 are asymmetrical about plane P (FIG. 9, 9B) and symmetrical about tooth centerline CT (FIG. 9B). In one example, tooth centerline CT coincides with centerline C of sprocket 10 (FIG. 5, 6).

In one example, drive-side relief 240 (including drive-side face relief 242 and drive-side flank relief 240) includes and/or is formed or defined by a surface 246 extended between drive-side surface 210 (including drive-side face 212 and drive-side flank 214) and lateral surface 208, and non-drive-side relief 250 (including non-drive-side face relief 252 and non-drive-side flank relief 254) includes and/or is formed or defined by a surface 256 extended between non-drive-side surface 220 (including non-drive-side face 222 and non-drive-side flank 224) and lateral surface 208.

More specifically, in one example, in cross-sectional view, surface 246 is a (substantially) linear surface such that drive-side relief 240 provides a beveled relief or chamfer between drive-side surface 210 and lateral surface 208 (and lateral tooth tip chamfer 236 and lateral tooth root chamfer 238), and surface 256 is a (substantially) linear surface such that non-drive-side relief 250 provides a beveled relief or chamfer between non-drive-side surface 220 and lateral surface 208 (and lateral tooth tip chamfer 236 and lateral tooth root chamfer 238). As such, in one example, asymmetry of second teeth 200 includes an (absolute value of) angle A1 of surface 246 relative to lateral surface 208 being less than an (absolute value of) angle A2 of surface 256 relative to lateral surface 208.

In one example, second teeth 200 each include a drive-side relief cut 260. In one example, drive-side relief cut 260 is formed or defined in drive-side relief 240. More specifically, in one example, drive-side relief cut 260 is formed or defined in drive-side face relief 242 and drive-side flank relief 244 of drive-side relief 240. In one example, drive-side relief cut 260 includes and/or is formed or defined by an arcuate (non-linear) "cut" in drive-side relief 240 extending from drive-side surface 210 toward lateral surface 208 to lateral tooth root chamfer 238. As such, drive-side relief cut 260 removes or excludes material of drive-side face relief 242 and drive-side flank relief 244 of drive-side relief 240 at or adjacent to drive-side face 212 and drive-side flank 214 of drive-side surface 210.

FIGS. 10-15 illustrate one example of sprocket 10 engaged with a section of a roller chain 50. Sprocket 10 engages roller chain 50 such that rotation of sprocket 10 about rotational axis R (FIG. 5) in drive direction D imparts movement to roller chain 50. In one example, roller chain 50 includes and/or is formed by alternating, overlapping pairs of laterally spaced apart outer link plates 52 and laterally spaced apart inner link plates 54.

In one example, cylindrical rollers 56 are provided between inner link plates 54 at opposite ends of inner link plates 54, and outer link plates 52 and inner link plates 54 are pivotally interconnected by link pins 58 extended through rollers 56 and overlapping, opposite ends of outer link plates 52 and inner link plates 54. As such, inner link plates 54 are interleaved with outer link plates 52, and outer link plates 52 and inner link plates 54 form alternating teeth receiving openings or spacings of different width. More specifically, in one example, outer link plates 52 and inner link plates 54 form alternating wide and narrow teeth receiving openings 60 and 62, respectively.

In one example, alternating wide and narrow teeth receiving openings 60 and 62 of roller chain 50 are engaged by respective alternating wide and narrow teeth 14 of sprocket 10. More specifically, second (wide) teeth 200 of sprocket 10 engage wide teeth receiving openings 60, and first (narrow) teeth 100 of sprocket 10 engage narrow teeth receiving openings 62. As such, in one example, width W2 (FIG. 4B) of second teeth 200 and width W1 (FIG. 4A) of first teeth 100 correspondingly cooperate with wide teeth receiving openings 60 and narrow teeth receiving openings 62, respectively, of roller chain 50.

In one example, a relief 152 is provided in bottom land 150 between adjacent teeth 100 and 200. In one example, relief 152 extends between drive-side 18 of one tooth and non-drive-side 20 of an adjacent tooth (or between non-drive-side 20 of one tooth and drive-side 18 of an adjacent tooth). In one example, separate reliefs 152 are provided in bottom land 150 on outboard side 24 and inboard side 26 of sprocket 10.

In one example, relief 152 includes and/or is formed or defined by an arcuate chamfer formed between bottom land 150 and body 12 of sprocket 10, and between the drive-side flank of one tooth and the non-drive-side flank of an adjacent tooth. More specifically, in one example, one relief 152 extends from drive-side flank 114 of first teeth 100 to non-drive-side flank 224 and non-drive-side flank relief 254 of an adjacent second tooth 200, and another relief 152 extends from drive-side-flank 214 of second teeth 200 to non-drive-side flank 124 of an adjacent first tooth 100. Providing relief 152 in bottom land 150 between adjacent teeth 100 and 200 helps to clear debris (e.g., mud) from bottom land 150 so as to clear an area for rollers 56 of roller chain 50.

In one example, as illustrated in FIGS. 14 and 14A and FIGS. 15 and 15A, when sprocket 10 is engaged with roller chain 50 and rotated (driven) in drive direction D, contact between teeth 14 of sprocket 10 and roller chain 50 includes contact between drive side 18 of teeth 14 and roller chain 50 and between lateral sides 22 of teeth 14 and roller chain 50. More specifically, when sprocket 10 is engaged with roller chain 50 and rotated (driven) in drive direction D, contact between second teeth 200 of sprocket 10 and roller chain 50 includes contact (direct contact) between drive-side surface 210 and rollers 56, and contact (incidental contact) between lateral surface 208 and outer link plates 52.

In addition, in one example, when sprocket 10 is engaged with roller chain 50 and rotated (driven) in drive direction D, tension is generated on roller chain 50 in a direction of drive direction D such that, in one example, any stretch or "play" in roller chain 50 results in reduced (minimal) contact between non-drive-side surface 220 and rollers 56 of roller chain 50 (as compared to contact between drive-side surface 210 and rollers 56). As such, in one example, width W4 of non-drive-side surface 220 is reduced (relative to width W3 of drive-side surface 210), and lateral surface 208 is extended toward non-drive-side surface 220 to increase (maximize) a surface area of lateral surface 208, as manifested in the asymmetry of second teeth 200.

By including drive-side relief 240 at drive side 18 of second teeth 200, as illustrated and described herein, contact between drive-side surface 210 of second teeth 200 and rollers 56 of roller chain 50 may be maintained (maximized) while maintaining clearance between second teeth 200 and inner link plates 54 of roller chain 50. In addition, with the asymmetry of second teeth 200, as illustrated and described herein, contact between lateral surface 208 of second teeth 200 and outer link plates 52 of roller chain 50 may be maintained (maximized) while maintaining clearance between second teeth 200 and inner link plates 54 of roller chain 50. More specifically, with a relief area formed by drive-side relief 240 being greater than a relief area formed by non-drive side relief 250, drive-side surface 210 may fit more deeply within an area ("pocket") formed between inner link plates 54 and rollers 56, so as to maximize (increase) contact between drive-side surface 210 and rollers 56 of roller chain 50.

Thus, by maintaining (maximizing) contact between drive-side surface 210 of second teeth 200 and rollers 56 of roller chain 50, and/or by maintaining (maximizing) contact between lateral surface 208 of second teeth 200 and outer link plates 52 of roller chain 50, retention of roller chain 50 on sprocket 10 may be maintained (improved). In addition, by maintaining (maximizing) contact between drive-side surface 210 of second teeth 200 and rollers 56 of roller chain 50, and/or by maintaining (maximizing) contact between lateral surface 208 of second teeth 200 and outer link plates 52 of roller chain 50, wear of sprocket 10 may be minimized (improved). Furthermore, by providing drive-side relief cut 260 in drive-side relief 240, as illustrated and described herein, additional clearance between teeth 200 and inner links plates 54 of roller chain 50 is provided.

Although specific examples have been illustrated and described herein, it will be appreciated by those of ordinary skill in the art that a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

What is claimed is:

1. A sprocket, comprising:
   teeth radially projecting from a body,
   the teeth including first teeth having a first maximum width and second teeth having a second maximum width greater than the first maximum width alternately arranged with the first teeth,
   the sprocket to rotate in a drive direction about a rotational axis, and the second teeth being asymmetrical about a plane extended radially from the rotational axis,
   the second teeth having a drive-side surface relative to the drive direction, a lateral surface at the second maximum width, a drive-side relief comprising a chamfer between the drive-side surface and the lateral surface, and a drive-side relief cut formed in the chamfer of the drive-side relief.

2. The sprocket of claim 1, wherein the first and second teeth comprise a series of alternating wide and narrow teeth relative to each other.

3. The sprocket of claim 1, further comprising:
   the second teeth being substantially symmetrical about a centerline oriented substantially perpendicular to the plane extended radially from the rotational axis.

4. The sprocket of claim 1, further comprising:
   the second teeth having a non-drive-side surface relative to the drive direction, and a non-drive-side relief comprising a chamfer between the non-drive-side surface and the lateral surface.

5. The sprocket of claim 1, further comprising:
   the drive-side surface of the second teeth including a drive-side face and a drive-side flank, and
   the drive-side relief including a drive-side face relief and a drive-side flank relief,
   wherein the drive-side relief cut is formed in the drive-side face relief and the drive-side flank relief.

6. The sprocket of claim 1, wherein the sprocket comprises a chainring.

7. A sprocket, comprising:
   first teeth having a first maximum width; and
   second teeth having a second maximum width greater than the first maximum width, the second teeth alternately arranged with the first teeth,
   the second teeth having a leading surface relative to a drive direction of the sprocket, a lateral surface at the second maximum width, a beveled relief providing a substantially linear transition between the leading surface and the lateral surface, and a relief cut in the substantially linear transition of the beveled relief,
   a midline of the lateral surface being offset relative to a plane extended radially through a center of a respective tooth.

8. The sprocket of claim 7, wherein the midline of the lateral surface is offset relative to the plane extended radially through the center of the respective tooth in a direction opposite the drive direction of the sprocket.

9. The sprocket of claim 7, wherein the beveled relief comprises a substantially linear surface from the leading surface to the lateral surface.

10. The sprocket of claim 7, wherein the second teeth are substantially symmetrical about a centerline extended through the leading surface.

11. The sprocket of claim 7, further comprising:
    the second teeth having a trailing surface relative to the drive direction of the sprocket, and a beveled relief providing a substantially linear transition between the trailing surface and the lateral surface.

12. The sprocket of claim 7, wherein the relief cut excludes material of the substantially linear transition of the beveled relief adjacent the leading surface.

13. A sprocket, comprising:

alternating first and second teeth, the first teeth having a first maximum width, and the second teeth having a second maximum width greater than the first maximum width, the second teeth having a drive side and a non-drive side relative to a drive direction of the sprocket, a drive-side surface at the drive side, a non-drive-side surface at the non-drive side, a non-orthogonal drive-side relief at the drive side, and a relief cut in the non-orthogonal drive-side relief, a maximum width of the drive-side surface being greater than a maximum width of the non-drive-side surface.

14. The sprocket of claim 13, further comprising:

the second teeth being asymmetrical about a plane extended radially from a rotational axis of the sprocket, and the second teeth being substantially symmetrical about a centerline oriented substantially perpendicular to the plane.

15. The sprocket of claim 13, further comprising:

the second teeth having a lateral surface at the second maximum width, and a lateral tooth root chamfer between the lateral surface and a root portion thereof, the non-orthogonal drive-side relief extended between the drive-side surface and the lateral surface, and the relief cut comprising an arcuate cut extended from the drive-side surface toward the lateral surface to the lateral tooth root chamfer.

16. The sprocket of claim 15, further comprising:

the lateral surface having a midline offset relative to a plane extended radially from a rotational axis of the sprocket in a direction opposite the drive direction of the sprocket.

17. The sprocket of claim 13, further comprising:

the second teeth having a non-orthogonal non-drive-side relief at the non-drive side.

18. The sprocket of claim 13, wherein the non-orthogonal drive-side relief provides a substantially linear transition from the drive-side surface to the second maximum width of the second teeth, wherein the relief cut removes material of the substantially linear transition adjacent the drive-side surface.

19. The sprocket of claim 1, wherein the chamfer of the drive-side relief comprises a substantially linear surface from the drive-side surface to the lateral surface, and wherein the drive-side relief cut removes material from the substantially linear surface adjacent the drive-side surface.

* * * * *